US009360219B2

(12) United States Patent
Roesler (10) Patent No.: US 9,360,219 B2
(45) Date of Patent: Jun. 7, 2016

(54) SUPERCRITICAL OR MIXED PHASE MULTI-PORT FUEL INJECTOR (75) Inventor: Timothy C. Roesler, Plainfield, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1150 days.

(21) Appl. No.: 13/337,738

(22) Filed: Dec. 27, 2011

(65) Prior Publication Data
US 2012/0167580 A1 Jul. 5, 2012

Related U.S. Application Data (60) Provisional application No. 61/428,756, filed on Dec. 30, 2010.

(51) Int. Cl.
F23R 3/28 (2006.01)
F02C 9/28 (2006.01)
F02C 7/22 (2006.01)
F02C 7/232 (2006.01)
F23R 3/14 (2006.01)

(52) U.S. Cl.
CPC ... *F23R 3/28* (2013.01); *F02C 7/22* (2013.01); *F02C 7/232* (2013.01); *F02C 9/28* (2013.01); *F02D 2200/0602* (2013.01); *F02D 2200/0606* (2013.01); *F23K 2301/206* (2013.01); *F23K 2900/05001* (2013.01); *F23K 2900/05141* (2013.01); *F23R 3/14* (2013.01)

(58) Field of Classification Search
CPC ....... F23R 3/28; F23D 11/26; F02M 37/0035; F02D 2200/0606; F05D 2270/303; F05D 2270/301; F02C 9/28; F02C 7/23202; F02C 7/22; F02C 7/232; F02C 9/32; F23K 2900/05141; F23K 2301/206

USPC ............... 60/740, 741, 742, 734, 39.281, 776
See application file for complete search history.

(56) References Cited

U.S. PATENT DOCUMENTS

| 3,023,575 | A | * | 3/1962 | Mccombs, Jr. | ............ F02C 9/46 138/46 |
| 3,779,007 | A | * | 12/1973 | Lavash | ...................... F02C 7/14 60/241 |
| 4,187,813 | A | | 2/1980 | Stumpp | |
| 4,189,914 | A | * | 2/1980 | Marek | ................... F02C 7/2365 261/28 |
| 4,506,503 | A | | 3/1985 | Ogborne et al. | |
| 4,901,524 | A | | 2/1990 | Shekleton et al. | |

(Continued)

OTHER PUBLICATIONS

International Search Report and Written Opinion, PCT/US2011/067480, Rolls-Royce North American Technologies, Inc., Apr. 24, 2012.

*Primary Examiner* — Phutthiwat Wongwian
*Assistant Examiner* — Stefan Ibroni
(74) *Attorney, Agent, or Firm* — Brinks Gilson & Lione (57) ABSTRACT A system includes a turbine engine with a fueling system including a valve fluidly coupled to a fuel supply on an upstream side and fluidly coupled to fueling passages on a downstream side. The valve maintains the fuel supply at a pressure greater than an ambient pressure. The system includes nozzle exits corresponding to the fueling passages, and the fueling passages flow fuel from the valve to each of the nozzle exits monotonically downward. The valve is a check valve or a controlled valve. The valve maintains the fuel supply at a pressure such that fuel in the fuel supply is a continuous fluid phase. The fuel leaves the nozzle exits to the combustion chamber of the turbine engine.

26 Claims, 7 Drawing Sheets

(56) References Cited

U.S. PATENT DOCUMENTS

| | | |
|---|---|---|
| 5,224,333 A | 7/1993 | Bretz et al. |
| 5,277,023 A * | 1/1994 | Bradley ............... F02B 77/04 239/119 |
| 5,404,711 A | 4/1995 | Rajput |
| 5,701,732 A * | 12/1997 | Nesbitt ............... F02C 7/232 60/39.094 |
| 5,826,423 A | 10/1998 | Lockyer et al. |
| 5,979,802 A | 11/1999 | Hasegawa |
| 6,012,652 A | 1/2000 | Holtan et al. |
| 6,755,024 B1 | 6/2004 | Mao et al. |
| 6,820,411 B2 | 11/2004 | Pederson et al. |
| 7,481,061 B2 * | 1/2009 | Gadde ............... F02C 9/263 60/778 |
| 2003/0084883 A1 | 5/2003 | Parrish |
| 2004/0226546 A1 | 11/2004 | Pellizzari et al. |
| 2006/0118651 A1 | 6/2006 | Kaneko et al. |
| 2009/0223226 A1 * | 9/2009 | Koizumi ............... F02C 3/22 60/736 |
| 2010/0018183 A1 | 1/2010 | Feiz |
| 2010/0031661 A1 | 2/2010 | Varatharajan et al. |
| 2010/0192579 A1 | 8/2010 | Boardman et al. |
| 2010/0269506 A1 | 10/2010 | Nonaka et al. |

* cited by examiner

SUPERCRITICAL OR MIXED PHASE MULTI-PORT FUEL INJECTOR

RELATED APPLICATIONS

The present application claims the benefit of U.S. Provisional Patent Application No. 61/428,756 filed Dec. 30, 2010 which is incorporated herein by reference.

BACKGROUND

The present application relates generally to fuel injection in a turbine engine, and more particularly but not exclusively relates to fuel injection where the fuel is in a mixed phase or supercritical fluid state. Presently available turbine engine fuel systems have fuel passages that are sized for warmed operation where the fuel is partially or completely vaporized. However, during operating conditions where liquid fuel is present, liquid can puddle in the fuel passages and/or cause variation in the flow rate or composition of fuel at the fuel injector nozzle. Systems that are sized favorably for liquid operation can suffer vapor lock when the fuel is vaporized. Therefore, developments in the technology are desirable.

SUMMARY

One embodiment is a unique apparatus for fueling a turbine engine with two-phased or supercritical fluid. Further embodiments, forms, objects, features, advantages, aspects, and benefits shall become apparent from the following description and drawings.

DESCRIPTION OF ILLUSTRATIVE EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 1:
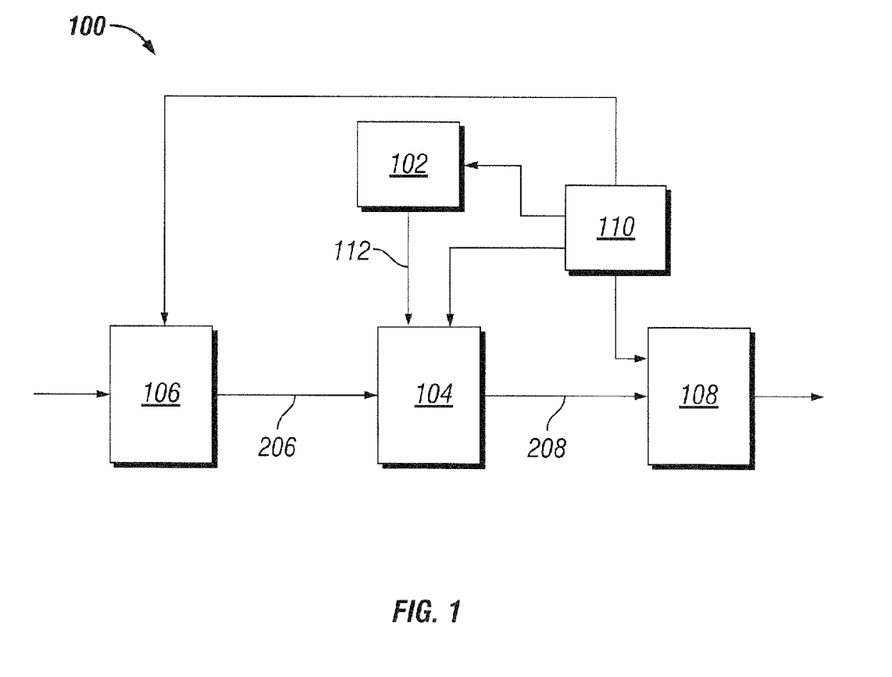
FIG. 1 is a schematic diagram of a system for fueling a turbine engine with 2-phase or super-critical fluid.

FIG. 1 is a schematic diagram of a system 100 for fueling a turbine engine (not shown) with 2-phase or super-critical fluid. The system 100 includes a fuel supply 102 and an air supply 106, each fluidly coupled to a mixer 104. The mixer 104 provides a combustion stream 208 including the airflow 206 mixed with fuel 112 passing from the fuel supply 102 through a valve, fueling passages, and nozzle exits. An exemplary portion of the system 100 including the valve, fueling passages, and nozzle exits, is described in the portion referencing FIG. 2 that follows. The system 100 further includes a combustion chamber 108 of the turbine engine wherein the combustion stream 208 is combusted. The system 100 further includes a controller 110 that functionally executes operations of fueling the turbine engine with 2-phase or super-critical fluid. The controller 110 is structured to operatively communicate with any sensor or actuator in the system 100. The controller 110 may be a single device or a distributed number of two or more devices. The operations of the controller 110 may be performed in hardware and/or in software.

Figure 2:
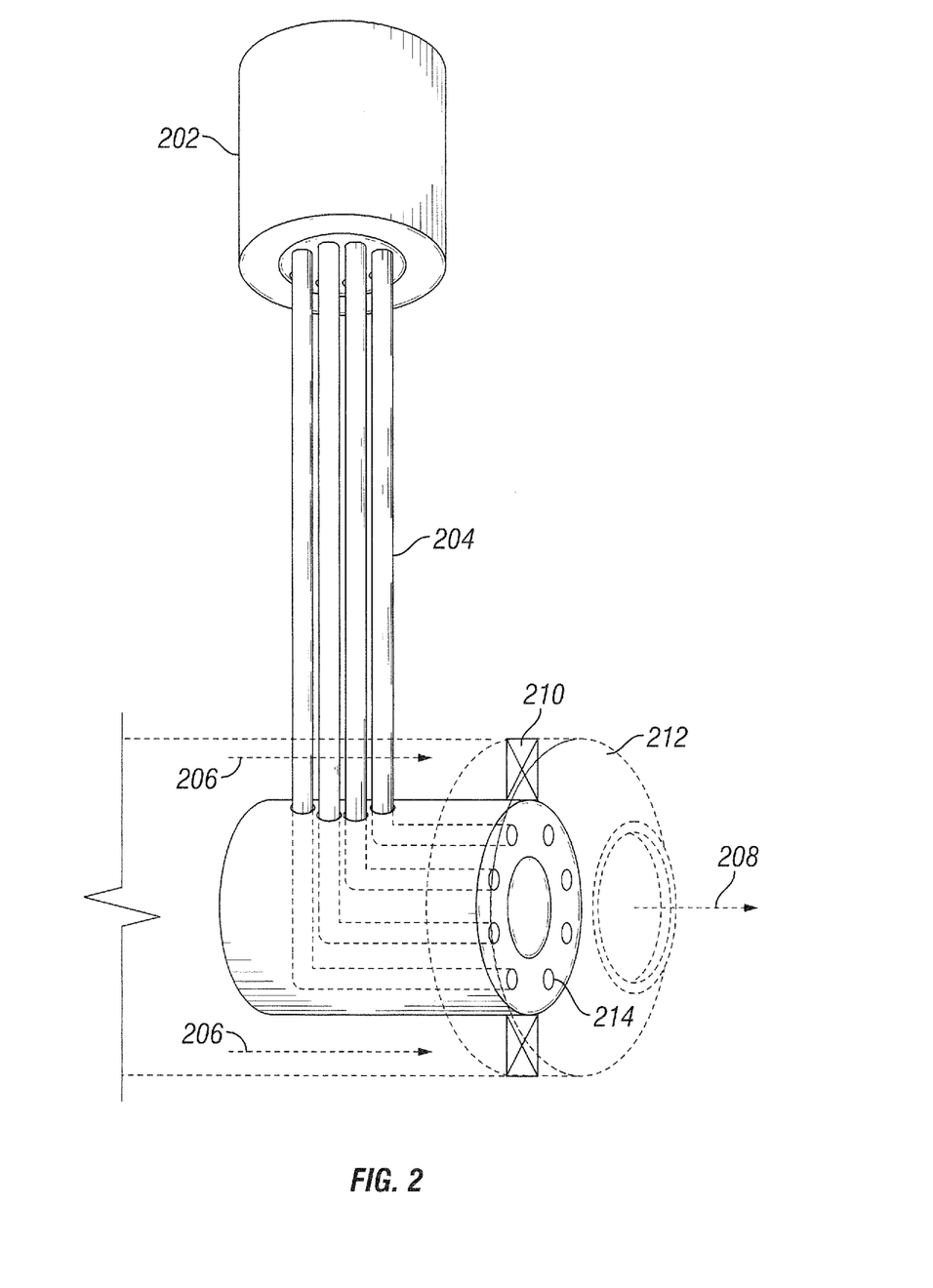
FIG. 2 is a portion of a fuel system for a turbine engine.

FIG. 2 is a portion of a fuel system for a turbine engine. The fuel system includes a valve 202 fluidly coupled to a fuel supply 102 on an upstream side and fluidly coupled to a number of fueling passages 204 on a downstream side. The valve 202 maintains the fuel supply 102 at a pressure greater than an ambient pressure. In certain embodiments, the valve 202 may further maintain the fuel supply 102 at a pressure greater than a liquid pressure for the fuel at a current temperature of the fuel, and/or at a pressure greater than a critical pressure of the fuel.

The valve 202 may be a check valve, for example a valve operated with a biasing member such as a spring holding the valve 202 closed until an operating pressure is exceeded. In certain embodiments, the valve 202 is responsive to a control signal from the controller 110. The controller 110 may provide a command to open or close the valve 202, or in certain embodiments the controller 110 may provide a command for a pressure in the fuel supply 102 to be maintained by the valve 202. The described operations of the valve 202 are exemplary and non-limiting.

Figure 5A:
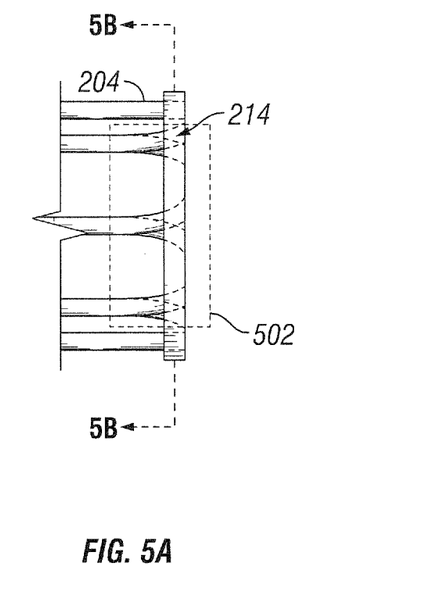
FIG. 5A is a first view of angled nozzle exits.
Figure 5B:
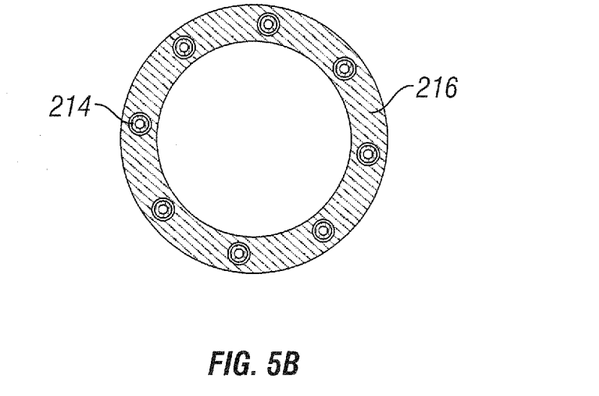
FIG. 5B is a second view of the angled nozzle exits.

The fuel system further includes nozzle exits 214 corresponding to the fueling passages 204. The fueling passages 204 are structured such that fuel flowing from the valve 202 to each of the nozzle exits 214 flows monotonically downward. Monotonically downward as used herein indicates flow passages 204 that, between the valve 202 and the nozzle exit 214, do not have any flow portions wherein the flowing fluid works against gravity when the turbine engine is nominally positioned (e.g. as installed on an airplane while the airplane is sitting on level ground). In certain embodiments, monotonically downward indicates that, between the valve 202 and the nozzle exit 214, the flow passages 204 do not substantially have any portions wherein the flowing fluid works against gravity. For example, referencing FIG. 5A, a swirl region 502 at the nozzle exits 214 includes the fuel passages having a characteristic shape that imparts a swirl character to the exiting fuel from the passage 204. Referencing FIG. 5B, a view at the face of the nozzle exits is illustrated. The exemplary nozzle exits 214 with the swirl region 502 are considered to be passages with a monotonically downward progression from the valve 202 to the nozzle exits 214. In the example of FIG. 2, the flow passages 204 are also considered to be passages with a monotonically downward progression from the valve 202 to the nozzle exits 214.

In certain embodiments, the valve 202 maintains the fuel supply 102 at a pressure greater than a critical pressure of the fuel. In a further embodiment, the valve 202 is a controlled valve and the controller 110 interprets a temperature of the fuel supply and provides the control signal in response to the temperature of the fuel supply. In one example, the controller 110 further provides the control signal such that the valve 202 maintains the fuel supply 102 at a pressure greater than a critical pressure of the fuel in response to the temperature of the fuel exceeding a threshold temperature. In a further example, the controller 110 maintains the fuel supply 102 at a pressure greater than a critical pressure of the fuel in response to the temperature of the fuel supply 102 exceeding, matching, and/or approaching a critical temperature of the fuel. In another embodiment, the controller 110 determines a temperature of the fuel supply 102, and maintains the pressure of the fuel supply 102 at a pressure sufficient to maintain the fuel in the fuel supply 102 as a liquid. The controller 110 can combine operations, for example providing a fuel supply 102 backpressure at the critical pressure during certain operating periods, providing fuel supply 102 backpressure at a liquid pressure during other operating periods, and providing no backpressure (e.g. opening the valve 202 fully) during yet other operating periods.

A total cross-sectional flow area of the plurality of fuel passages 204 is sufficient to prevent vapor lock at a rated fueling value where the fuel is in any phase, including liquid, vapor, super-critical fluid, or two-phase fluid. The total fuel passage 204 area to prevent vapor lock depends upon the flow rate of the fuel, the size and number of passages, the turndown ratio of the turbine engine, the viscosity of the gaseous fuel, and other parameters that vary with specific embodiments of the system 100 and that are normally available to one of skill in the art when the design of a specific embodiment is known. An exemplary embodiment includes the valve 202 providing backpressure to the fuel supply 102 such that a fuel pump (not shown) upstream of the valve 202 remains primed with liquid fuel even while the turbine engine is operating at high temperatures. An exemplary controller 110 determines the temperature of the fuel supply 102, or the temperature of the fuel at the upstream fuel pump, and provides commands to the valve 202 in response to the determined temperature. Another exemplary controller 110 provides commands to the valve 202 in response to a predetermined pressure value—for example a pressure required at the fuel supply 102 to maintain liquid fuel at a highest estimated operating temperature for the fuel at the upstream fuel pump.

The fuel system in the illustration of FIG. 2 includes a main fuel injection nozzle body 212 that receives air 206, where the air is passed through swirlers 210 to provide a desired flow characteristic. The air 206 mixes with the fuel passing through the nozzle exits 214 to form the combustion stream 208 that is passed to the combustion chamber 108. An exemplary embodiment includes the air 206 having a flow rate and characteristic to provide the combustion stream 208 with a desired fuel atomization or other predetermined characteristic.

Figures 3A, 3B:
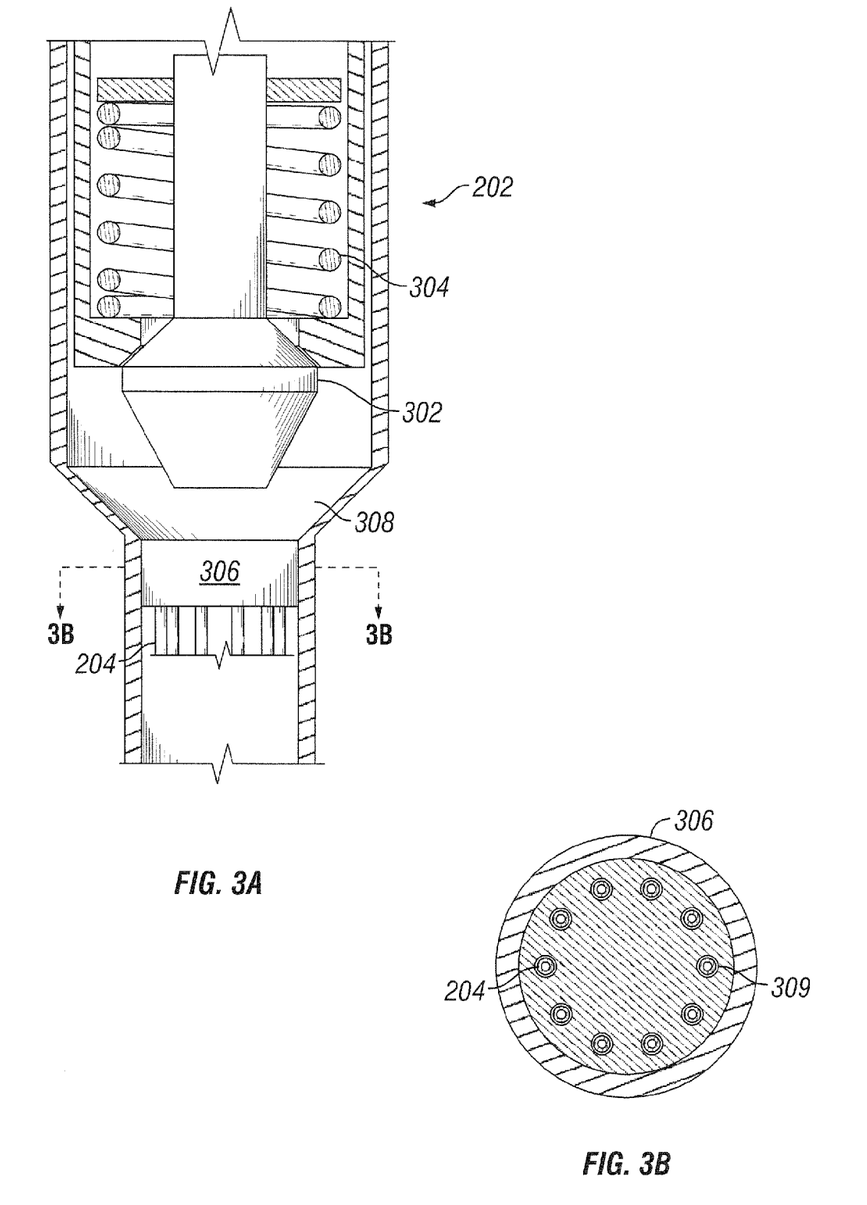
FIG. 3A is a first view of a valve and expansion chamber for a fuel system for a turbine engine.
FIG. 3B is a second view of the valve and expansion chamber for a fuel system for a turbine engine.

Referencing FIG. 3A, a first view of a valve and expansion chamber is illustrated. The fuel exits the valve 202 past a valve body 302 into the fuel passages 204. The exemplary expansion chamber 308 is positioned between the valve 202 and the passages 204. Each fuel passage 204 includes an inlet 309 (reference FIG. 3B). In the example, the inlets 309 are positioned in a disk 306. Each inlet 309 has an equivalent fuel receiving environment relative to the valve 202. In the example of FIG. 3A, each inlet 309 is positioned at an identical distance and position relative to the valve body 302, such that the fuel passages 204 receive identical fuel flow and composition. The valve inlets 309 on the disk 306 are radially distributed around a geometric center.

In certain embodiments, the equivalent fuel receiving environment may be obtained through other design mechanisms, for example computational fluid dynamics and/or simple data gathering can provide fluid passage inlet 309 configurations, including passage area and spacing, that provide equivalent fuel receiving environments for an elliptical valve body 302 or for other environmental variables that differ from the illustration of FIG. 3A. The valve 202 in FIG. 3A is a spring 304 biased check valve, for example where the spring 304 provides biasing pressure such that the fuel supply 102 is always above the critical pressure for the fuel. The valve 202 may be a check valve, a controlled valve, or a combination valve (e.g. with a mechanical biasing member and an electronically controlled actuator). Any biasing member known in the art, including at least a counterweight, an elastic members, and/or a stressed mechanical object, is contemplated herein.

Figure 4A:
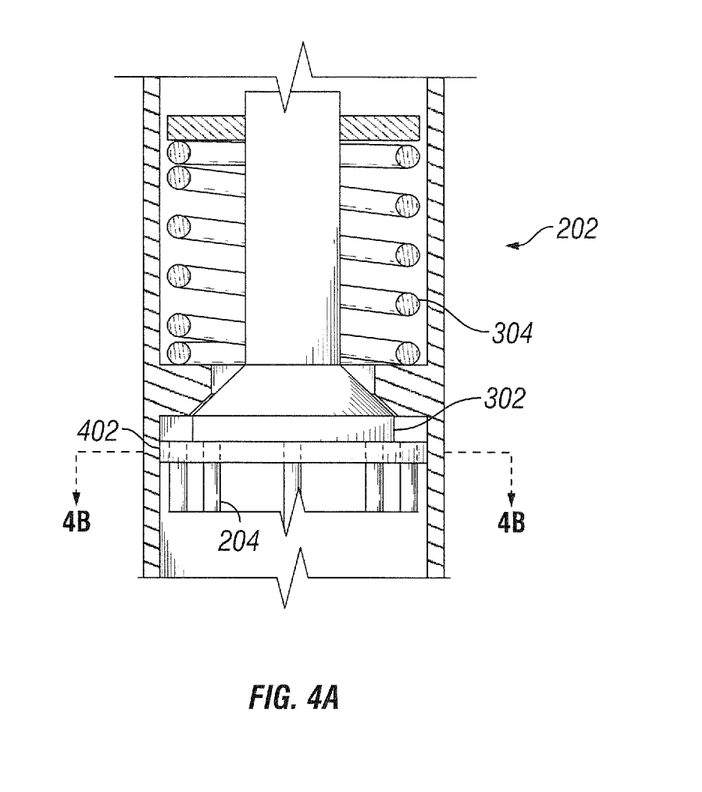
FIG. 4A is a first view of a valve without an expansion chamber for a fuel system for a turbine engine.
Figure 4B:
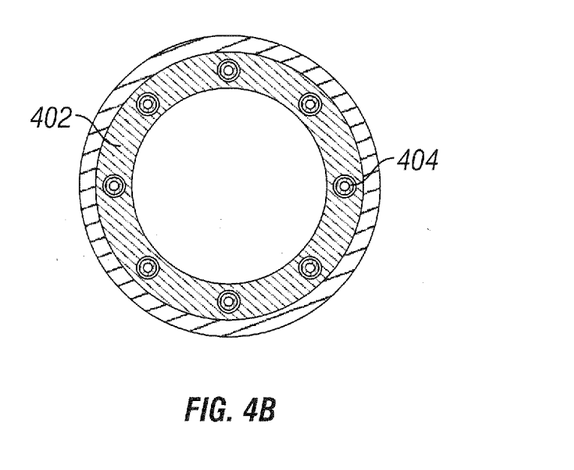
FIG. 4B is a second view of the valve without an expansion chamber for a fuel system for a turbine engine.

Referencing FIG. 4A, a valve 202 without an expansion chamber 308 for a fuel system for a turbine engine is illustrated. The valve body 302 in FIG. 4A covers the fuel passage inlets 404 when the valve 202 is in a closed position. Referencing FIG. 4B, a second view of the valve 202 without the expansion chamber is illustrated. The fuel passage inlets 404 in the example of FIG. 4B are positioned around a ring 402 sized to receive the valve body 302. The valve body 302 in FIG. 4A fluidly couples all fuel passage inlets 404 to the fuel supply 102 when the valve 202 is open by moving the valve body 302 down. Each inlet 404 has an equivalent fuel receiving environment from the valve 202. In the example of FIG. 4A, each inlet 404 includes an identical distance and position relative to the valve body 302, such that the fuel passages 204 receive identical fuel flow and composition.

Figure 7:
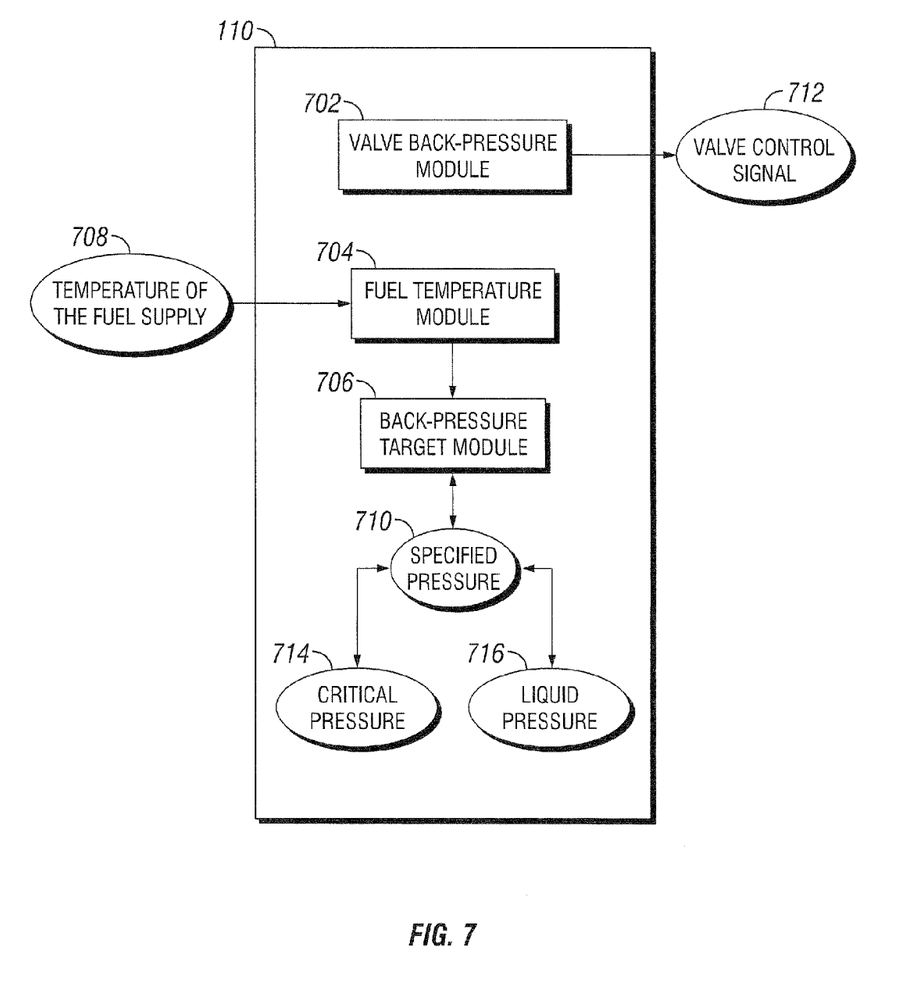
FIG. 7 is a schematic block diagram of a controller for controlling a valve to provide a specified backpressure on a fuel supply.

FIG. 7 is a schematic block diagram of a controller 110 for controlling a valve 202 to provide a specified backpressure on a fuel supply 102. The controller 110 includes modules that functionally execute the operations of the controller 110. The use of modules in the description emphasizes the functional independence of the operations of the controller 110, and the modules selected illustrate one potential organization for the operations of the controller 110. Some or all of the functions performed by any module may be combined with the functions performed by other modules, and some of the functions performed by any module may be divided. A module may be a software element (e.g. as a function or sub-routine) on a single controller, and/or may be divided among a plurality of controllers. Some of the operations of a module may be implemented in hardware rather than software. Certain modules may not be present in certain embodiments of the system.

Certain operations described herein includes operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

The controller 110 depicted in FIG. 7 includes a valve backpressure module 702, a fuel temperature module 704 and a backpressure target module 706. The valve backpressure module 702 provides a valve control signal 712 to control the valve 202 to maintain the fuel supply pressure at a specified pressure 710. The valve control signal 712 includes a command to open or close the valve, an electrical output (e.g. a voltage, current, and/or frequency) to which the valve responds by opening or closing, and/or a commanded backpressure for the valve. In certain embodiments, the fuel temperature module 704 interprets a temperature of the fuel supply 708, and the backpressure target module 706 determines the specified pressure 710 as a function of the temperature of the fuel supply 708. The specified pressure 710 includes a critical pressure 714 and/or a liquid pressure 716. An exemplary liquid pressure is a pressure sufficient to maintain fuel in the fuel supply 102 as a liquid at the temperature of the fuel supply 708. The liquid pressure 716 may be the pressure of required to maintain the fuel as a liquid at an upstream pump position, a pressure to maintain the fuel for a predetermined fuel temperature, or any other liquid pressure 716 understood in the art.

Figure 6:
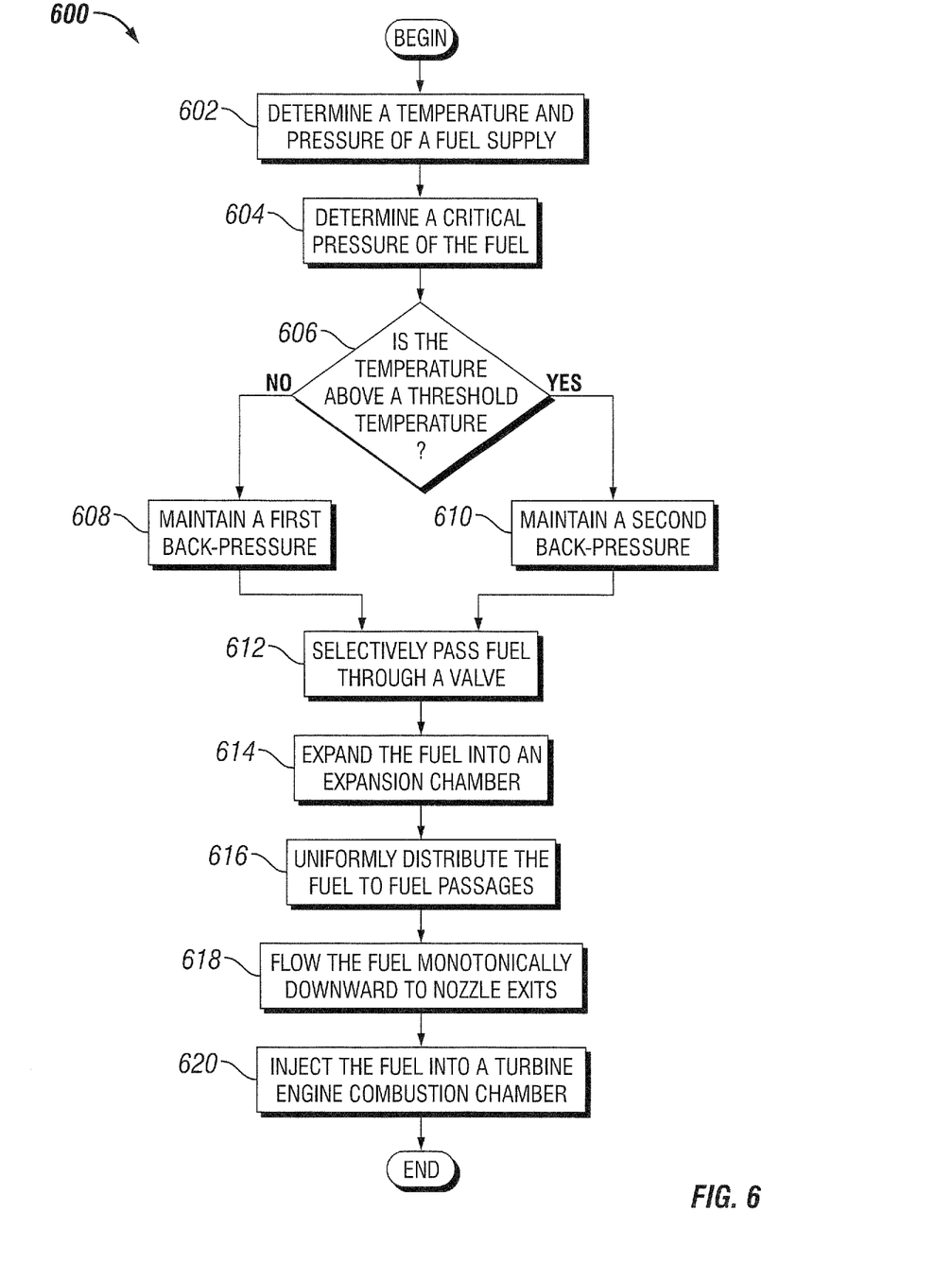
FIG. 6 is a schematic flow diagram of a technique for fueling a turbine engine with 2-phase or super-critical fluid.

The schematic flow diagram in FIG. 6 and related description which follows provides an illustrative embodiment of a technique for fueling a turbine engine with a super-critical or mixed phase fluid. Operations illustrated are understood to be exemplary only, and operations may be combined or divided, and added or removed, as well as re-ordered in whole or part, unless stated explicitly to the contrary herein.

FIG. 6 is a schematic flow diagram of a technique 600 for fueling a turbine engine with 2-phase or super-critical fluid. The technique 600 includes an operation 602 to determine a temperature and/or a pressure of the fuel supply, and an operation 604 determining a critical pressure for the fuel. The technique 600 includes a determination 606 whether the temperature of the fuel is above a threshold temperature. In response to the temperature of the fuel being below the threshold temperature, the technique 600 includes an operation 608 to maintain a first back-pressure on the fuel supply. An exemplary first back-pressure is a back-pressure that maintains the fuel supply in a liquid state at the temperature of the fuel. In response to the temperature of the fuel being greater than the threshold temperature, the technique 600 includes an operation 610 to maintain a second back-pressure on the fuel supply. An exemplary second back-pressure is a pressure that is greater than the first back-pressure, and in certain embodiments the second back-pressure is a pressure that maintains the fuel supply in a liquid state at the temperature of the fuel, and/or a pressure that is greater than or equal to a critical pressure of the fuel.

The exemplary technique 600 further includes an operation 612 to selectively pass fuel through a valve. In certain further embodiments, the technique 600 includes an operation 614 to expand the fuel into an expansion chamber. The exemplary technique 600 further includes an operation 616 to uniformly distribute the expanded fuel to a number of fuel passages, and an operation 618 to flow the fuel monotonically downward through the fuel passages to a number of nozzle exits. The technique 600 further includes an operation 620 to inject the fuel into a into a combustion chamber of a turbine engine.

As is evident from the figures and text presented above, a variety of embodiments according to the present invention are contemplated.

One embodiment is a system including a turbine engine having a fueling system, the fueling system including a valve fluidly coupled to a fuel supply on an upstream side and fluidly coupled to a plurality of fueling passages on a downstream side, where the valve is structured to maintain the fuel supply at a pressure greater than an ambient pressure. The system includes nozzle exits corresponding to the plurality fueling passages, and the fueling passages are structured such that fuel flowing from the valve to each of the nozzle exits flows monotonically downward. The valve can be a check valve and/or a controlled valve. In the exemplary embodiment, the check valve maintains the fuel supply at a pressure greater than a critical pressure of the fuel. The fuel exits the valve into the plurality of fuel passages, and may pass through an expansion chamber positioned between the valve and the passages.

The controlled valve opens in response to a control signal, and the system further includes a controller that interprets a temperature of the fuel supply and provides the control signal in response to the temperature of the fuel supply. The controller further provides the control signal such that the valve maintains the fuel supply at a pressure greater than a critical pressure of the fuel in response to the temperature of the fuel exceeding a threshold temperature.

A total area of the plurality of fuel passages is sufficient to prevent vapor lock at a rated fueling value where the fuel is in any phase, including liquid, vapor, super-critical fluid, or two-phase fluid. Each fuel passage includes an inlet that receives fuel from the valve, where each inlet has an equivalent fuel receiving environment. The nozzle exits may be angled such that such that exiting fuel has a swirl flow component.

Another exemplary embodiment is a method including maintaining a backpressure against a fuel supply for a turbine engine, where the backpressure is greater than a critical pressure for a fuel of the turbine engine. The method further includes selectively passing fuel through a valve, uniformly distributing the passed fuel to a plurality of fuel passages, and flowing the passed fuel monotonically downward through the fuel passages to a plurality of nozzle exits. The method further includes injecting the passed fuel through the nozzle exits into a combustion chamber of the turbine engine.

The exemplary method includes adding a swirl flow component to the injected fuel, and/or expanding the fuel into an expansion chamber disposed between the valve and the fuel passages. The method includes maintaining the backpressure by determining a critical pressure for the fuel, sensing a pressure of the fuel supply, and commanding the valve to open in response to the pressure of the critical pressure for the fuel and the pressure of the fuel supply. In certain embodiments, the method includes maintaining the backpressure by determining a temperature of the fuel supply, and commanding the valve to open in response to the temperature of the fuel supply.

Yet another exemplary embodiment is an apparatus including a fuel supply having a valve, wherein the valve maintains the fuel supply at fuel supply pressure greater than an ambient pressure. The apparatus includes a plurality of fueling passages fluidly coupled to the valve, a fuel injection nozzle that receives fluid flowing from the fueling passages, where the fuel injection nozzle includes an outlet fluidly coupled to a combustion chamber of a turbine engine. The fueling passages are structured such that fuel flowing from the valve to each of the nozzle exits flows monotonically downward. The apparatus includes a controller having a valve backpressure module that controls the valve to maintain the fuel supply pressure at a specified pressure.

In certain embodiments, the controller further includes a fuel temperature module that interprets a temperature of the fuel supply, and a backpressure target module that determines the specified pressure as a function of the temperature of the fuel supply. The specified pressure includes a critical pressure and/or a pressure sufficient to maintain fuel in the fuel supply as a liquid at the temperature of the fuel supply. The apparatus may include an expansion chamber interposed between the valve and the plurality of fuel flow passages, and the plurality of fueling passages may be radially distributed around a geometric center. The exemplary apparatus further includes air flow passages that provide an airflow induced swirl to a combustion stream including the airflow mixed with fuel passing from the nozzle exits.

Yet another exemplary embodiment is an apparatus including a fuel supply for a turbine engine, and a means for maintaining a specified pressure in the fuel supply such that fuel in the fuel supply comprises a single continuous phase. The means for maintaining a specified pressure in the fuel supply such that fuel in the fuel supply comprises a single continuous phase include: a check valve that provides a specified backpressure on the fuel supply, a controlled valve that provides sufficient backpressure on the fuel supply to maintain the fuel supply as a liquid, a controlled valve that provides sufficient backpressure on the fuel supply to maintain the fuel supply as a supercritical fluid, and a check valve and/or controlled valve that provides backpressure on the fuel supply in response to a temperature of the fuel supply.

The apparatus further includes a plurality of fueling passages fluidly coupling the valve to a plurality of nozzle exits and means for flowing equal amounts of fuel to each of the fueling passages from the fuel supply. The means for flowing equal amounts of fuel to each of the fueling passages from the fuel supply includes geometrically positioning entry points to the fueling passages in an equivalent configuration relative to an opening of the valve, providing the fueling passage openings in an equivalent flow position relative to the valve via entry spacing and openings determined according to computational fluid dynamics, providing the entry points to the fueling passages in a radial distribution around a center downstream of an expansion chamber, and providing the fuel supply, valve, and fueling passage openings such that the openings are directly exposed to the fuel supply when the valve opens. In a further embodiment, the apparatus further includes means for determining a temperature of the fuel supply. The means for determining the temperature of the fuel supply include a fuel supply temperature sensor, a temperature model for the fuel supply, reading the fuel supply temperature from a parameter stored on a computer readable storage medium, and receiving the fuel supply temperature as a message or part of a message on a network or datalink connection.

The apparatus further includes means for adjusting the specified pressure in response to the temperature of the fuel supply. The means for adjusting the specified pressure in response to the temperature of the fuel supply include a controller that changes the specified pressure responsive to the temperature of the fuel supply, a biasing member in the valve that changes the biasing force in response to the temperature of the fuel supply, and a hardware device that changes biasing force of the valve in response to a change in the temperature of the fuel supply (e.g. a solenoid that adds or removes biasing force from the valve in response to the temperature of the fuel supply). The apparatus can further include means for maintaining a specified fuel flow rate in response to the specified pressure. The means for maintaining a specified fuel flow rate in response to the specified pressure include a pump upstream of the valve responsive to the backpressure to provide a specified fuel flow rate and a restriction upstream of the valve responsive to the backpressure such that the provided fuel from the fuel supply maintains the specified fuel flow rate.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A system, comprising:
a turbine engine having a fueling system, the fueling system comprising:
a fuel injector;
a plurality of fueling passages within the fuel injector;
a body;
a valve in the body, the valve fluidly coupled to a fuel supply of a fuel on an upstream side and fluidly coupled to the fueling passages on a downstream side, wherein the valve is configured to maintain the fuel on the upstream side at a pressure at or greater than a critical pressure of the fuel; and
an expansion chamber within the body interposed between the valve and the fueling passages,
wherein the expansion chamber is configured to receive the fuel that passes through the valve,
wherein each of the fueling passages has a corresponding inlet within the body, the inlets of the fueling passages are distributed over a surface of a disc, and each of the inlets is configured to receive a portion of the fuel from the expansion chamber, and
wherein each of the fueling passages is configured to flow the portion of the fuel received from the expansion chamber monotonically downward.

2. The system of claim 1, wherein the valve comprises a check valve.

3. The system of claim 1, wherein the valve comprises a controlled valve structured to open in response to a control signal, the system further comprising a controller structured to interpret a temperature of the fuel supply and to provide the control signal in response to the temperature of the fuel supply.

4. The system of claim 3, wherein the controller is further structured to provide the control signal such that the valve maintains the fuel supply at a pressure at or greater than the critical pressure of the fuel in response to the temperature of the fuel exceeding a threshold temperature.

5. The system of claim 1, wherein a total area of the plurality of fueling passages is sufficient to prevent vapor lock at a rated fueling value where the fuel is in any phase of matter.

6. The system of claim 1, wherein all of the inlets comprise an equivalent fuel receiving environment.

7. The system of claim 1 further comprising a plurality of nozzle exits corresponding to the plurality fueling passages, wherein the plurality of nozzle exits are angled such that exiting fuel has a swirl flow component.

8. The system of claim 1, wherein the plurality of fueling passages are a plurality of tubular fueling passages, ends of the tubular fueling passages are configured to inject the fuel directly into air that passes the ends of the tubular fueling passages, and the fuel and the air form a combustion stream.

9. A method comprising:
maintaining a backpressure against a fuel supply on an upstream side of a valve for a turbine engine;
selectively passing fuel through the valve within a housing;
passing the fuel from the valve to an expansion chamber;

distributing the passed fuel from the expansion chamber to a plurality of fuel passages through inlets arranged on a surface of a disc within the housing that faces an opening of the valve, the opening of the valve on a downstream side of the valve, the valve and the inlets included in a housing;

flowing the passed fuel through the fuel passages to a plurality of nozzle exits outside of the housing; and injecting the passed fuel through the nozzle exits into a combustion chamber of the turbine engine.

10. The method of claim 9, wherein the flowing comprises flowing the fuel monotonically downward.

11. The method of claim 9, wherein said injecting comprises adding a swirl flow component to the injected fuel.

12. The method of claim 9, further comprising expanding the fuel into an expansion chamber disposed between the valve and the inlets of the plurality of fuel passages.

13. The method of claim 9, wherein the maintaining the backpressure further comprises determining a critical pressure of the fuel, sensing a pressure of the fuel supply, and commanding the valve to open in response to the determined critical pressure of the fuel and the sensed pressure of the fuel supply.

14. The method of claim 9, wherein the maintaining the backpressure further comprises determining a temperature of the fuel supply, and commanding the valve to open in response to the temperature of the fuel supply.

15. An apparatus, comprising:
a valve configured to maintain a fuel from a fuel supply at a fuel supply pressure;
a plurality of fueling passages fluidly coupled to the valve, wherein each of the fueling passages has a corresponding inlet, the inlets of the fueling passages are distributed over a surface of a disc facing the valve, each of the inlets is positioned on the surface to receive a portion of the fuel from the valve, and wherein the valve and inlets are included in a body;
a fuel injection nozzle configured to receive fluid flowing from the fueling passages, the fuel injection nozzle having an outlet fluidly coupled to a combustion chamber of a turbine engine, the fuel injection nozzle outside of the body that includes the valve and the inlets of the fueling passages; and
a controller comprising a valve backpressure module structured to control, in response to a control signal, the valve to maintain the fuel supply pressure at or greater than a critical pressure of the fuel of the fuel supply.

16. The apparatus of claim 15, wherein the fueling passages are structured such that fuel flowing from the valve to each of the nozzle exits flows monotonically downward.

17. The apparatus of claim 15, wherein the controller further comprises a fuel temperature module structured to interpret a temperature of the fuel supply, and a backpressure target module structured to determine a specified pressure as a function of the temperature of the fuel supply.

18. The apparatus of claim 17, wherein the specified pressure comprises one of the critical pressure of the fuel and a pressure sufficient to maintain fuel in the fuel supply as a liquid at the temperature of the fuel supply.

19. The apparatus of claim 15, further comprising an expansion chamber interposed between the valve and the inlets of the plurality of fueling passages.

20. The apparatus of claim 15, wherein the inlets of the plurality of fueling passages are radially distributed on the surface around a geometric center.

21. The apparatus of claim 15, further comprising a plurality of air flow passages structured to provide an airflow induced swirl to a combustion stream comprising airflow mixed with fuel passing from exits of the plurality of fueling passages.

22. An apparatus, comprising:
a fuel supply for a turbine engine;
a means for maintaining a specified pressure in the fuel supply, the means disposed within a housing, the specified pressure at or greater than a critical pressure of a fuel of the fuel supply; and
a plurality of fueling passages fluidly coupling the means for maintaining the specified pressure to a plurality of nozzle exits, wherein each of the fueling passages has a corresponding inlet, the inlets of the fueling passages are positioned on a surface of a plate within the housing, the surface exposed to the means for maintaining the specified pressure, each of the inlets is positioned on the surface to receive a portion of fuel received from the means for maintaining the specified pressure.

23. The apparatus of claim 22, further comprising a means for determining a temperature of the fuel supply and a means for adjusting the specified pressure in response to the temperature of the fuel supply.

24. The apparatus of claim 23, further comprising a means for maintaining a specified fuel flow rate in response to the specified pressure.

25. The apparatus of claim 22, wherein the fueling passages are configured to flow fuel monotonically downward from the means for maintaining a specified pressure to each of the nozzle exits.

26. The apparatus of claim 22, wherein the plate is a disk.

* * * * *